United States Patent [19]
Weiss et al.

[11] 3,951,799
[45] Apr. 20, 1976

[54] FILTRATION PROCESS

[75] Inventors: Donald Eric Weiss, Blackburn; Hendrik Adriaan Jacobus Battaerd, North Clayton, both of Australia

[73] Assignees: Commonwealth Scientific and Industrial Research Organization; Imperial Chemical Industries of Australia; New Zealand Limited, all of Campbell, Australia

[22] Filed: Nov. 20, 1974

[21] Appl. No.: 525,685

Related U.S. Application Data

[62] Division of Ser. No. 138,679, April 29, 1971, Pat. No. 3,890,224.

[30] Foreign Application Priority Data

May 4, 1970 Australia.............................. 1083/70

[52] U.S. Cl.................................... 210/75; 210/80; 210/506
[51] Int. Cl.² ........................................ B01D 35/06
[58] Field of Search ............... 210/42, 222, 223, 75, 210/80, 502, 506

[56] References Cited
UNITED STATES PATENTS

| | | | |
|---|---|---|---|
| 2,642,514 | 6/1953 | Herkenhoff.......................... | 210/222 |
| 2,954,122 | 9/1960 | Colburn.............................. | 210/222 |
| 3,124,725 | 3/1964 | Leguillon............................ | 210/222 |
| 3,349,918 | 10/1967 | Ike....................................... | 210/223 |
| 3,375,925 | 4/1968 | Carpenter........................... | 210/222 |
| 3,549,527 | 12/1970 | Peck et al........................... | 210/223 |
| 3,607,740 | 9/1971 | Akeroyd et al..................... | 210/223 |
| 3,690,454 | 9/1972 | Bekhtle et al...................... | 210/222 |
| 3,697,420 | 10/1972 | Blaisdell et al..................... | 210/222 |

FOREIGN PATENTS OR APPLICATIONS 2,063,523  9/1971  France................................ 210/223

*Primary Examiner*—Thomas G. Wyse
*Attorney, Agent, or Firm*—Cushman, Darby & Cushman

[57] ABSTRACT

A method of phase separation using ferromagnetic materials. A mixture of phases is treated with particles or granules of ferromagnetic material so that one of the phases is preferentially absorbed or collected onto or into the particles or granules. The particles or granules of the ferromagnetic material together with the absorbed or collected phase may then be recovered from the remainder of the mixture using magnetic means.

11 Claims, 1 Drawing Figure

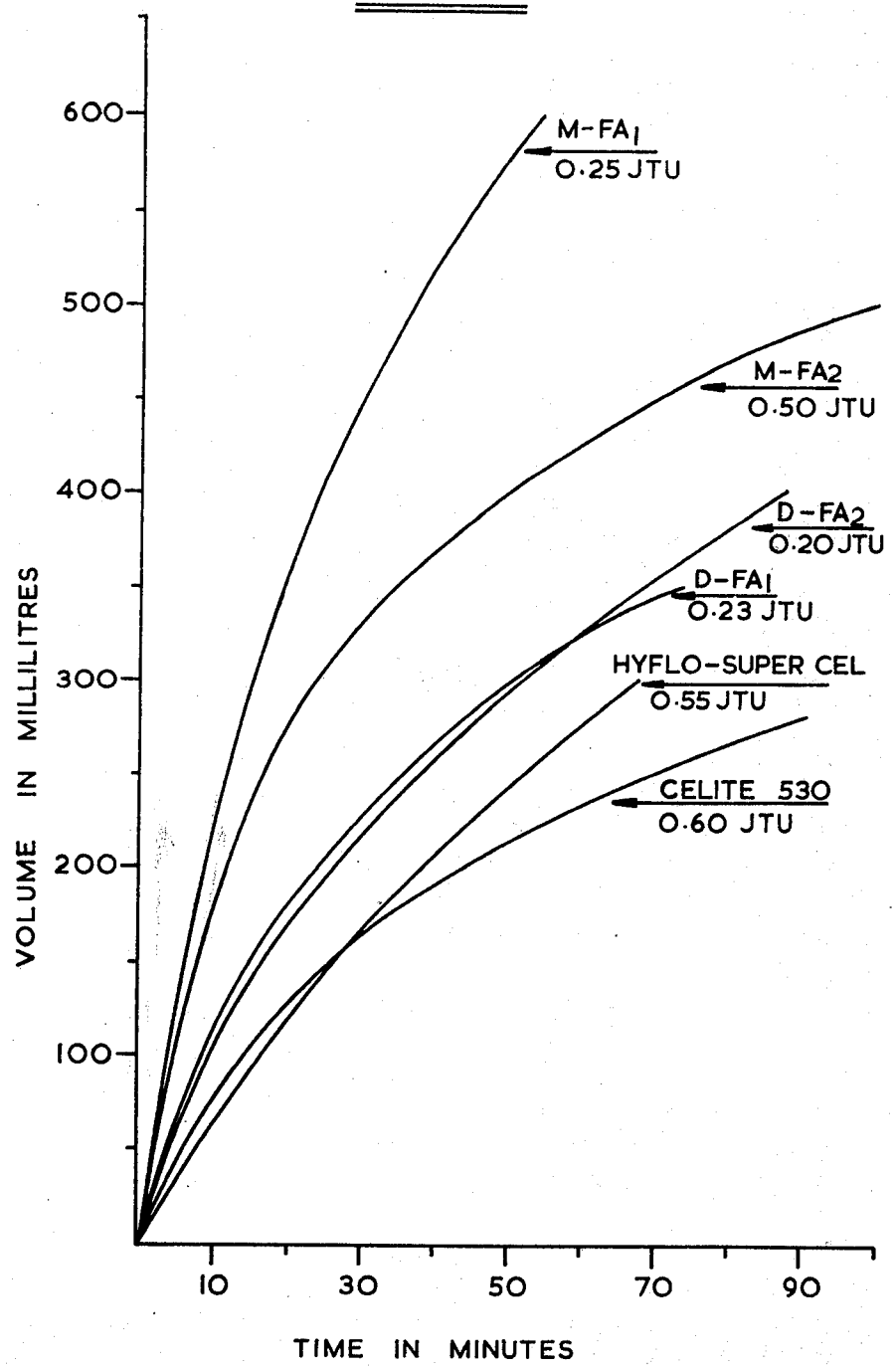

FILTRATION PROCESS

This is a division of application Ser. No. 138,679 filed Apr. 29, 1971, now U.S. Pat. No. 3,890,224.

This invention is concerned with an improved method of phase separation.

Conventional means of separating the constituent phases of a mixture such as, for example, allowing a mixture of liquids to separate into discrete layers and then removing one layer from contact with the other layer, or by separating a solid from a liquid by filtration, can be extremely inefficient in certain instances. For example, emulsions and colloidal solutions are particularly difficult to separate out into their constituent phases. Also in instances where a second phase forms a minor proportion, or even a mere trace proportion of the whole of the mixture, such as when an oil slick is present on the surface of sea water, efficient removal of such a proportion is particularly difficult. It is also difficult to remove solids such as occur in water supplies or sewage effluents, or gelatinous precipitates, such as hydrated metal hydroxides, from aqueous media.

We have now found a method whereby different phases in a system may be separated, one from another, in an extremely efficient manner.

Accordingly we provide a process of phase separation, said process comprising the treatment of a mixture of phases with ferromagnetic material in particulate or granular form whereby at least part of one phase of the said mixture is absorbed or collected into or onto said particulate or granular material and the separation by magnetic means, of said particulate or granular material, together with said absorbed or collected portion of the mixture, from the remainder of the mixture.

Although inorganic ferromagnetic materials such as, for example, gamma-iron oxide or magnetite, are of use in certain applications such as, for example, the use of ferromagnetic materials in reducing the entrainment of water in air, in many applications it is preferred to use a synthetic polymer comprising ferromagnetic material.

One class of suitable polymers for use in a given multi-phase mixture in which at least one of the phases is a liquid are those which are preferentially wetted by a liquid phase of the mixture. The wettability of polymers, or the critical surface tension is defined as being the lowest surface tension a liquid in contact with the polymer can have and still exhibit a contact angle greater than zero. Values for the critical surface tension of a number of polymers are given in "Polymer Handbook" (Edited by J. Brandrup and E. H. Immergut, published by J. Wiley & Sons Inc., 1966) Section III, pages 113 – 114. This may be used as a guide to the selection of polymers which will be preferentially wetted by a liquid but is, of course, not limiting and many other suitable polymers have been described in the art. The chemical constitution of the polymers is not critical except insofar as the polymer should have adequate insolubility as well as mechanical and chemical stability in the mixture; the main criterion for selection is wettability. Thus, suitable polymers for use in our invention can be chosen from all types of polymers such as both addition and condensation polymers; furthermore such polymers may be grafted onto the surface of a different polymer particle in order to achieve the desired wetting properties.

A second class of suitable polymers are those which will preferentially absorb one of the phases of the mixture. Suitable polymers are those which will swell in good solvents for the polymer and will not do so in non-solvents. A table useful in the selection of suitable polymers of this class is to be found in "Polymer Handbook" referred to above, Section 17, pages 185 – 234. Phase separation may thus be achieved if the constituent phases of the mixture comprise a good solvent and a non-solvent for a selected polymer. Furthermore, heating such polymers, when in a swollen state, can in favourable situations cause contraction of the structure and exudation of the absorbed solvent. Certain of these polymers may be cross-linked. The cross-linking of such polymers can be of two types. In one type the cross-links are randomly distributed throughout the polymer network. In another type, for example with polymers of the shell type, the polymer chains are insolubilised by the ends of their chains being grafted on to an impervious, inert supporting core by methods known in the art. The chain mobility in such whisker-like structures is much greater than in the randomly cross-linked polymers and favours thermal contraction of the chains provided they are in a rubber-like state.

Suitable polymers may be of natural or synthetic origin and of the types referred to as condensation or addition polymers, homo polymers or random, block or graft copolymers.

Suitable polymers are, for example, polystyrene, copolymers of styrene and polyesters, polyesters, methyl methacrylate polymers and copolymers e.g. with the ethylene glycol dimethacrylate, phenol formaldehyde resins, polyvinyl chloride, polyethylene, polyamides. These polymers and copolymers are normally hydrophobic in character and therefore find application mainly in separating hydrocarbons from aqueous phases such as for example separating oil slicks from water and also as filter aids in non-aqueous systems.

Other polymers are, for example, polyvinyl alcohol, urea formaldehyde resins and melamine formaldehyde resins. These polymers are normally hydrophilic and find main application as filter aids in aqueous systems and in separating traces of a polar phase from a non-polar phase.

The efficiency of the process also depends on the size, size distribution and shape of the polymer particles or granules. The greater the external surface area of the particles or granules the greater the amount of material which will be collected onto the surface and also the more rapidly will the process occur.

The size range of particles of use in our invention is not narrowly critical and depends on the conditions of use. For example we have found that relatively coarse particles of from 500 to 5000 microns overall diameter are best for certain applications such as, for example removing oil slicks from the surface of the sea especially in windy weather. For use as filter aids smaller particles are preferred. Preferably the average size of the particles or granules is from 0.1 to 500 microns overall diameter, more preferably from 0.5 – 40 microns.

The amount of material absorbed or collected in or on a given weight of polymer particles or granules will also be increased by the presence of voids in the particles or granules. Such voids may be predominantly interconnected with the particle surface; such particles are called reticulated or retiporous particles or granules. Alternatively the voids may occur predominantly as completely sealed voids; such particles are termed vesicular particles or granules. Furthermore the particles may be of a heterogeneous structure for example made up of layers such as a shell of one polymer grafted on and around a particle, formed from a different polymer with or without voids. The vesicules are of particular use in adjusting the specific gravity of particles. Particles may be of regular shape but it is preferred that they be of irregular shape such that they cannot pack closely and that they have a low packing density and increase the volume of the void space. Such particles are particularly useful for the separation of solid/liquid and solid/gas phases.

The particles or granules together with the absorbed or collected material may be removed from the residual phase of phases by any suitable physical means, such as filtration, centrifugation or sedimentation, or the like.

However, although such means are satisfactory, they are relatively time consuming, when the particles or granules are in the preferred size range. We have now found that small particles or granules of certain polymers containing ferromagnetic materials and an absorbed phase may be removed very efficiently from the residual phase or phases by use of a magnetic field.

Accordingly we provide a process of separating phases of a mixture one from the other which process comprises treating the mixture of phases with a particulate or granular ferromagnetic synthetic polymeric material so as to absorb or collect at least part of one phase of the mixture into or onto said particulate or granular material and separating said particulate or granular material together with the absorbed or collected portion of the mixture by magnetic means.

The ferromagnetic particles, with their absorbed material may be removed from the other phase (or phases) by known means described in the art, such as, for example, by direct removal with a magnetic separator or by magnetising the particles so as to induce flocculation annd resultant rapid settling of the particles together with absorbed material. Thus in the instance of a two phase system wherein one of the phases has been absorbed on the ferromagnetic particles and the residual phase is a liquid, the residual supernatant liquid can then be decanted from the settled floc. The particles can remain magnetised during the process of absorbing the phase, the increased void volume of such magnetically flocculated particles is advantageous as it provides additional void space for retention of the absorbed material.

Suitable ferromagnetic polymers have a ferromagnetic component incorporated either wholly or partially within a layer of polymer. Subsequent layers of the same or different polymers may be grafted on or added. The ferromagnetic components can, for example, be either a soft ferrite, a hard ferrite or a material which exhibits reversible magnetism such as gamma-iron oxide, magnetite or chromium dioxide. The ferromagnetic material must obviously be of a particle size smaller than the polymer particles to be prepared. Certain suitable ferromagnetic materials such as for example mill scale are very expensive to grind to the desired degree of fineness. Magnetic iron oxides, by contrast, are simple to prepare as fine powders and are therefore convenient to use where a reversible ferromagnetic polymeric material is required. The greater ease of dispersion of an unmagnetised, reversible ferromagnetic material, as compared to a hard ferrite which becomes magnetic when ground to the required degree of fineness, is advantageous when the material is to be incorporated within polymers.

The ferromagnetic polymeric materials used in this invention may be prepared by the normal methods known in the art. Suitable methods which may be mentioned include the following. The magnetic material may be dispersed in a monomer or monomer mixture which may then be polymerised to give the required particles. Another method is to compound a mixture of a polymer and magnetic material together by a milling operation. The finely ground mixture may then be granulated to give material of the required size range. In yet another method magnetic material may be dispersed in a solution of liquid polymers which may then be cross-linked in a curing process. Another method is to deposit a polymer onto magnetic material by polymerisation from the vapour phase by any suitable method known in the art. A polymer may also be precipitated from a solution onto a dispersion of magnetic particles so as to encapsulate them. Methods for encapsulation are known in the art.

The material absorbed or collected onto the particles or granules may be recovered or removed by simple physical or chemical means. For example, the material may be removed by washing, pressing, distillation or by solvent extraction. In some instances, the absorbed material can be partially removed by heating the polymer particles so as to induce shrinkage and exudation of absorbed material. The recovered particles of granules may be reused.

There are many situations where it is required to remove very small amounts of finely divided, or gelatinous particulate matter such as clays and organic matter from for example, surface water supplies or from effluents from sewage treatment plants. One such situation relates to the desalination of water supplies by ion exchange processes utilising counter-current, reverse flow, regeneration procedures. The efficiency of such processes relies on the development of a concentration gradient within the bed which must not be destroyed between successive regeneration and absorption cycles. Consequently back-washing of the bed, which is required to remove accumulated particulate matter, must be infrequent and prefiltration of the feed water is usually essential to reduce the rate of clogging of the ion exchange bed. When because of adverse kinetics as for example in the so-called Sirotherm process of water desalination using thermal regeneration of ion exchange resins, it is desirable also to operate an ion exchange fixed bed process with resins having the smallest possible particle size (e.g. 50 – 100 mesh as compared with the more usual 20 – 50 mesh standard resins) prefiltration is an essential requirement for successful operation to reduce clogging of the bed and distributors. One object of this invention is therefore to provide an improved prefiltration process for such applications. In other situations, for example, the treatment of raw sewage itself, the separation of hydrous metal hydroxides in hydrometallurgical operations or in chemical processing, the concentration of suspended solids is much higher.

In all these instances direct filtration of the suspension is often not practical as the result of rapid blinding of the pores of the filter medium by the finely divided or gelatinous material. One known procedure for increasing filtration rates in such situations is to first precoat the filter medium with a filter aid — i.e. a chemically inert solid having a low packing density (e.g. diatomaceous earth) before starting the filtration. In addition to forming a precoat it is also often advantageous to continue to add small amounts of filter aid to the feed so as to maintain the porosity of the accumulation of filter cake ("body feed" technique). The bed of particles provides an incompressible layer of high porosity and permits rapid filtration until the accumulation of particulate matter within the voids of the filter and blocks the layer. When the concentration of suspended matter is very low (e.g. about 10 ppm), as in some water supplies, this technique is economically feasible even though the filter aid must be discarded along with the filter cake. However, when the concentration of suspended solids is high, the necessary discarding of the filter aid often makes the process uneconomic.

We have now found that our invention will allow for the easy regeneration of the phase separation aid.

Accordingly we provide a process of separating the phases in a mixture comprising suspensions of particulate matter in a liquid medium which process comprises firstly precoating a filter medium with a layer of fine particles or granules of a wettable ferromagnetic material; secondly passing said mixture, optionally in admixture with further ferromagnetic material, through the precoat layer on the filter medium so as to separate the particulate matter and ferromagnetic material from the liquid phase; thirdly separating said ferromagnetic material from the particulate matter by magnetic means.

The ferromagnetic material separated and recovered by the above process may be reused in phase separation processes, thus leading to a reduction in filter aid costs. In instances where it is desired to recover the particulate matter, for example in chemical processing or mineral recovery, the ease of separation of the ferromagnetic filter aid is advantageous. Preferably the ferromagnetic material is a synthetic ferromagnetic polymer.

The selection of suitable polymers is not narrowly critical and can be based on the criterion of wettability as set out hereinbefore. The polymer should also be insoluble in the liquid medium used.

For use in polar media, for example water, typical polymers of use in our process are ferromagnetic particles incorporated wholly or partially within, for example, polyvinyl alcohol, urea formaldehyde resins and melamine formaldehyde resins.

Preferably the specific gravity of the ferromagnetic polymeric material should be such that the settling rate of the unmagnetised filter aid is comparable with the settling rate of the solid phase to be removed. Adjustment of the specific gravity is achieved by methods well known in the art, for example, for the production of vesicular particles.

We have found that shell grafted polymers are of particular use in this aspect of our invention especially if the reactive shell contains groups such as polyelectrolytes which will cause flocculation of the fine particles of suspended solid phase to be separated.

Suitable shell grafted polymers comprising polyelectrolytes are, for example, particles comprising an inert core consisting of polyvinyl alcohol or urea formaldehyde resin grafted with a shell of polyacrylic acid, polyacrylamide or polymethylacrylate or polymers derived from quaternised amino monomers.

The separation of the solid phase from the ferromagnetic particles may be accomplished by firstly dispersing the filter cake in a small amount of a suitable liquid by known means (e.g. mechanical or ultrasonic dispersive procedures). The ferromagnetic material is then recovered by magnetic means for example with the aid of a magnetic separator or by magnetic flocculation. If desired, the separated ferromagnetic material may be dispersed with a small amount of a suitable liquid and then recovered to ensure that particulate matter is not inadvertantly contained in the ferromagnetic material prior to reuse. Repeated magnetisation, and demagnetisation of the ferromagnetic particles is an effective way of dislodging attached particulate matter.

If the filter aid is magnetised, when used during the filtration cycle, the void volume, and therefore the porosity of the precoat layer, will be greater than when the filter aid is unmagnetised. It is therefore possible to regulate the porosity of the precoat by regulating the extent to which the ferromagnetic particles have been magnetised.

In order to obtain a uniform coating on vertical filter septums it is desirable that the filter aid does not settle too rapidly in the feed slurry. Consequently it is advantageous to use ferromagnetic polymer particles of the vesicular type in order to reduce their specific gravity and to apply the particles in an unmagnetised state.

In the treatment of sewage with a magnetic filter aid according to our invention, the filter cake with the organic particulate matter may be redispersed in a fraction of the circulating liquid stream and the resulting sludge digested. After the organic materials have been decomposed by bacterial action the filter aid may be recovered from the humus sludge by magnetic means and reused. Some of the supernatant liquid after the separation of humus sludge can be recirculated for redispersion of the filter aid. Similarly mixtures containing gelatinous hydrated metal hydroxides often encountered in mineral extraction may be filtered easily, using ferromagnetic particles. These particles may be reused.

The problem of removing slicks of oil from water is growing in the world and concern over the effect of pollution on the ecology of the ocean and the amenities of its environs is widespread. Many methods of treating oil slicks have been proposed but these methods merely transfer the problem to another ecological system. For example it has been proposed to emulsify the oil with a detergent which will of course spread the pollution throughout the body of the water or for example it has been proposed to sink the oil with heavy mineral powder such as gypsum or stucco, which will pollute the lower levels of the ocean. However, our invention may be used to remove oil slicks efficiently and without damage to ecological systems.

Accordingly we provide a method of removing oil slicks from aqueous media, said method comprising: firstly, treating said slick with sufficient fine particles or granules of ferromagnetic material being characterised in that said ferromagnetic material preferentially absorbs or adsorbs oil from aqueous media and also the particles or granules float on the aqueous media when associated with the oil; secondly removing said particles together with the associated oil by magnetic means.

Preferably the ferromagnetic material is a synthetic ferromagnetic polymer. The selection of suitable polymers is not narrowly critical and can be based on the criterion of wettability in the oil phase. The polymer should also be insoluble in both the oil phase and the aqueous phase.

Suitable ferromagnetic polymeric materials for use in this aspect of our invention include, for example, ferromagnetic particles incorporated wholly or partially within polystyrene or copolymers of styrene and polyesters.

The specific gravity of the ferromagnetic polymeric particles may be adjusted by methods known in the art. Ferromagnetic vesicular and retiporous particles are convenient to use as their specific gravity is readily controlled by methods known in the art.

A magnetic field may be, for example, generated by a boom drawn above or below the surface of the water. The particles and associated oil may be removed from the boom by any suitable mechanical means either continuously or periodically.

A further advantage of using ferromagnetic particles or granules for phase separation is that the force of the magnetic field used for collecting the said particles or granules is such that it will exert sufficient pressure on the particles or granules for them to assume a compact form without however, squeezing the collected phase from between the particles. A still further advantage of using certain ferromagnetic particles or granules is that after collection the particles or granules will be magnetised and will tend to clump together and adhere to any ferromagnetic material. Therefore they may be easily conveyed by means of ferromagnetic belts or other conveyor means. The particles or granules may be easily demagnetised by passing them through any suitable demagnetiser. It is sometimes advantageous to use a soft ferrite containing polymer as such a polymer may be dispersed more readily so as to facilitate its application to an oil slick, for example, by a spraying technique. Such soft ferrite materials are strongly attracted by a magnetic field and can therefore be collected readily by magnetic means.

Our invention is also of use in a phase separation problem encountered in cooling towers. In normal operation of cooling towers water flows over a packing, or is sprayed countercurrent to an air flow and there is often a substantial loss of water due to the entrainment of water droplets by the exit air stream. This is of course an example of a liquid/gas phase system and suitable hydrophilic ferromagnetic particles may be dispersed in the water entering the tower, to allow the air and water to be separated more efficiently, by increasing the settling rate of the water droplets and to permit their trapping by magnetic means.

Magnetised particles are usually preferred, for use in such a process because the void volume, and settling rate of magnetised particles is greater than that of unmagnetised particles. Magnetised ferromagnetic particles, encapsulated with a polymer are more readily redispersed and are therefore particularly useful.

Accordingly we provide a process of separating liquid and gas phases which process comprises the separation of droplets of a liquid containing ferromagnetic materials wettable by said liquid, entrained in a gas stream by magnetic means.

In applying the method to a cooling tower the feed water to the tower is first mixed with ferromagnetic particles and the slurry then passed through the tower, countercurrent to an air stream. At the base of the tower there is a settling basin where the particles are removed from the cooled water by magnetic means. Spray loss from the tower is reduced because the droplets settle more rapidly owing to their containing ferromagnetic materials; however any droplets entrained in the exit air could be recovered by magnetic means. For example, droplets containing such magnetic particles in the exit air may be passed over baffles of polymers loaded with magnetised particles e.g. barium ferrite and preferably with water repellant surfaces e.g. a fluorinated hydrocarbon. This attracts the magnetic water particles and thereby reduces losses. The particles accumulate on the surface through the coalescing effect of the water film, growing in size until they eventually slide off the magnetic surface. Other magnetic devices may be utilised to facilitate removal of the water from the magnetic particles.

The particles may be inorganic ferromagnetic materials or ferromagnetic materials encapsulated by hydrophilic polymers, or encapsulated by hydrophobic polymers with surfaces of a hydrophilic nature grafted thereon.

To these polymeric magnetic particles may be attached algicides or the like to inhibit slime growth in the tower. The magnetic particles may be, for example, soft ferrites, hard ferrites or intermediate materials such as gamma-iron oxide.

Another phase separation problem which benefits from the use of ferromagnetic polymeric particles is the sealing of pipe joints, particularly where a united mobility in such joints is desired, such as, for example, in the sealing of joints in sewerage pipes or gas pipe lines. Owing to soil movement it is extremely difficult to prevent cracks developing at the joints of underground pipes. Liquids from the ground, for example, water, percolate through such joints and this is most undesirable as in sewage pipes for example it increases the volume of effluent for disposal or treatment and raises the salinity of the effluent when the ground water is saline.

We have now discovered that when the surfaces of the joints in pipes are magnetised and the space between the magnetised surfaces is packed with finely divided, hydrophobic magnetised particles having surfaces which are not wetted by water, the magnetic field holds the particles in place, even when the joints move, and the water repellency of their voids prevents entry of water. A refinement is to form a paste having the consistency of a grease with the hydrophobic ferromagnetic particles and an oil which preferentially wets the particles and which is highly resistant to microbiological attack e.g. fluorinated hydrocarbons or silicones. The paste is then applied to the magnetic joints.

The magnetic surfaces in the joints may be for example a layer of magnetic material either bonded with a cement e.g. portland cement or bonding adhesives stable in the environment.

Accordingly we provide a method of sealing pipes, with a flexible joint, such that fluid may not percolate into or out of the pipe through the said joint, said method comprising the use of a sealant comprising a composition of a finely divided ferromagnetic particles optionally in the presence of a stable oil, said oil wetting the said particles, and the use of said sealant in the joints of magnetised pipes whereby the magnetic force of the pipes holds the sealant in place in the joint.

Our process may also be used in the separation of solid and gas phases wherein the solid phase is separated from a gas phase, for example, the removal of solid particulate matter from flue gases, by passing the mixed phases through a filtration device comprising ferromagnetic materials.

The process of our invention is also of use in liquid/liquid extraction. When a liquid medium contains a very small concentration of a given material it is often difficult or expensive to extract efficiently the material into a second liquid medium. For example aqueous solutions containing metal salts may be treated with complexing agents to form complexes such as chelates soluble in non-polar solvents. However in the past relatively large amounts of non-polar solvent have been required to remove small amounts of complexes because of the difficulty of separating the aqueous and organic phases efficiently and the process has therefrom been expensive for removing trace impurities. We have found that our process of phase separation may be employed to separate the phases after a liquid/liquid extraction and particularly when one phase is a small proportion of the whole composition. This embodiment of our invention has the advantage that by its use trace impurities may be removed from effluent from chemical, municipal and industrial plant process streams and metallurgical operations in an economical manner.

Accordingly in the process of liquid/liquid extraction comprising extracting a compound from a solution of the compound in a liquid medium with a second liquid medium immiscible with the first liquid medium we provide the improvement consisting of separating the two liquid phases by firstly adding ferromagnetic particles being characterised in that said ferromagnetic particles preferentially absorb or adsorb the second liquid medium; and secondary removing said particles together with the associated second liquid medium by magnetic means. This embodiment of our invention although for use for separating any proportions of the two liquid media is of especial use when the second liquid media is only a minor proportion of the total composition, for example less than 10% w/w of total composition.

In order to work a liquid/liquid extraction process efficiently using small proportions of extracting liquid it is desirable for the two liquids to be mixed together extremely well. This thorough mixing can lead to emulsions which render the prior art methods of separation of phases extremely inefficient. The process of our invention however separates the constituent phases of emulsions without difficulty.

In order to remove certain compounds from solution it is desirable to add suitable complexing agents either directly to the first liquid medium or dissolved in the second liquid medium. The purpose of those complexing agents is to form a complex with the compound which complex has a more favourable partition coefficient than the compound for extraction by the second liquid medium.

The nature of the complexing agent depends upon the nature of the compound to be removed. The complexing agent should form a complex with the compound to be removed. The nature of the second liquid medium depends upon the nature of the first liquid medium and also upon the properties of the complex found between the complexing agent and the compound to be removed. In liquid/liquid extractions it is desirable for the two media to be mutually insoluble and for the complex to be freely soluble in the second liquid medium and sparingly soluble in the first liquid medium. Suitable combinations of liquid media and complexing agents for liquid/liquid extractions are well known in the art. It is possible to choose an organic liquid medium which acts both as the second liquid medium and as the complexing agent and use of such an organic liquid medium falls within the scope of our invention.

Although the ferromagnetic particles may be any particles with the required characteristics we prefer that the ferromagnetic material is a synthetic ferromagnetic polymer.

In liquid/liquid extractions of trace materials from an aqueous solution with a non-polar media suitable synthetic ferromagnetic polymers are as described hereinabove as suitable for the removal of oil slicks from water. This embodiment of our invention is of particular use in removing small amounts of metals salts from the process streams and effluents of hydrometallurgical mining operations.

Our invention is illustrated in, but not limited by, the following examples in which all parts and percentages are by weight unless otherwise stated and by the accompanying FIG. 1 which provides certain comparative flow rate data.

EXAMPLE 1

This is an Example of the preparation of a ferromagnetic polymeric particle of use in our invention.

A dispersion of gamma-iron oxide was prepared as follows:

"Bayer S11 gamma-iron oxide" (Trade Mark for a gamma-iron oxide) (51 g.) was added to a solution of 5.1 g. of "Teric PE68" (Trade Mark of Imperial Chemical Industries of Australia and New Zealand Limited for an alkylene oxide condensate) in 400 mls of water and stirred vigorously until the dispersion consisted of clusters of oxide particles smaller than 5 microns.

A solution of polyvinyl alcohol (491 mls of a 20% solution w/v) and 2 g. of "Gelvatol 20–30" (Trade Mark for a polyvinyl alcohol) was added and the suspension stirred until it consisted of clusters of oxide particles smaller than 5 microns.

To the above suspension was added a 25% aqueous solution of glutaraldehyde (200 mls) and 2 N.HCl (70 ml) with rapid stirring. The solution was immediately dispersed into 2 l. of kerosene to which had been added 40 g. of "Span 80" (Trade Mark for sorbitan mono-oleate) and 10 g. of "Tween 85" (Trade Mark for a polyoxyethylene sorbitan mono-oleate).

Vigorous stirring was continued for one hour followed by gentle agitation for about 6 hours. The product was filtered off, washed with kerosene, hexane and finally acetone until the filtrate was clear. The particles so obtained were dried and cured for 1 hour at 100° C. 170 g. of particles were obtained with an average size of 10 microns and containing 60% w/v of gamma-iron oxide.

EXAMPLE 2

This Example demonstrates the ease with which a dispersion of ferromagnetic particles may be settled out from a liquid. The particles obtained in Example 1 (1 g.) were dispersed by shaking with 100 ml. of water in a 200 ml stoppered measuring flask. The dispersion took more than 20 minutes to settle. However, when a similarly prepared dispersion was held over a strong magnet the dispersion settled in a few seconds. The settled particles were demagnetised in an apparatus described by G. W. Davis (Physics 6 184 (1935)).

The demagnetised particles could be redispersed to yield a composition having the same properties as the initially prepared dispersions. When the magnetised particles were redispersed without demagnetisation, the so formed dispersion settled in a few seconds.

The particles were magnetised and demagnetised many times without damage to the particles.

EXAMPLE 3

This is an example of the preparation of a shell grafted particle suitable for use in our invention.

The particles (26.7 g.) prepared in Example 1 were added to 100 mls of styrene. The mixture was purged with nitrogen and irradiated in a nitrogen atmosphere with Cobalt 60 gamma-rays at a dose rate of 0.11 M. Rad/hr. to a total dose of 5.1 M. Rad. The particles were removed and washed with benzene until free of homopolymer and finally washed with methanol and dried under reduced pressure at 65° C. 56.4 g. of particles were obtained containing 52.7% of polystyrene.

EXAMPLE 4

This Example demonstrates the removal of an oil slick from the surface of water.

To a 12 inch dish containing 100 ml of water was added 1 ml of crude oil. The particles (approximately 200 mg.) prepared in Example 3 were dusted over the surface. The particles were wetted by the oil and when a magnet was moved close to the surface of the water the particles and associated oil were removed leaving an almost clean surface.

EXAMPLE 5

This is an example of destroying an oil slick by burning.

Water (100 ml) and crude oil (1 ml) were placed in a 12 inch dish. The particles prepared in Example 3 were magnetised by placing them in a strong magnetic field for a brief time. The magnetised particles so prepared (100 mg) were placed in the centre of the oil slick prepared above. The oil was attracted towards the small clump of particles. The particles formed a wick and the oil was ignited and removed by burning.

EXAMPLE 6

Examples 6 to 9 describe the preparation of vesicular polystyrene particles of use in our invention.

A mixture of fumaric acid, phthalic anhydride and propylene glycol in the molar proportions of 3:1:4 respectively, with an acid value of 38 and Gardner Holt body Z2 at 70% w/w in styrene was prepared. To this polyester solution (29.5 lbs.) was added with high speed stirring, 11.8 lbs. of styrene, 1 lb. of benzyl peroxide (55% w/w is dibutyl phthalate) and 20 lbs. of "S11 gamma-iron oxide". The mixture was stirred until all the compounds were well dispersed.

A second mixture was prepared by mixing water (66 lbs.), a 2.25% w/w hydroxyethyl cellulose concentrate (8.25 lbs.), "Gelvatol 20/90" (5.5 lbs.) (Trade Mark for a polyvinyl alcohol), diethylene triamine (51 g.) and aqueous ammonia s.g. 0.88 (3.74 g.).

The first mixture was added under vigorous stirring by means of a fluted stirrer to the second mixture. More water (110 lbs.) was added and after flushing with nitrogen the mixture was heated at 90° C for two hours when the polymerisation was virtually complete. After polymerisation the mixture was diluted 5-fold with water and the particles allowed to settle, washed by decantation and dried at 105° C. Vesicular particles were obtained containing an average of 50% void space. The average particle size was 15–20 microns.

EXAMPLE 7

Example 6 was repeated except that the gamma-iron oxide of that Example was replaced by "Ferrox cube 3E" (Trade Mark for a soft ferrite). This is an example of the preparation of a vesicular particle with soft ferrite properties.

EXAMPLE 8

Example 6 was repeated except that the gamma-iron oxide of that Example was replaced by "Black iron oxide 318M" (Trade Mark for a hard ferrite). This is an Example of the preparation of a vesicular particle with hard ferrite properties.

EXAMPLE 9

Example 6 was repeated except that only 3 lbs. of styrene was used instead of the 11.8 lbs. used in that Example. The particles formed in this example were of irregular shape.

EXAMPLE 10

This is an example of the removal of oil slicks on water surfaces and the recovery of the polymer for reuse. Fuel oil (10 mls) was placed in a 12 inch dish containing 100 ml of water. Polymer particles (5 g.) prepared in Example 6 were dusted over the oil slick and the contents of the dish were vigorously stirred. The particles floated to the top of the water associated with most of the oil, and the oil and particles were removed using a magnet covered with a thin polythene film. The particles were separated from the associated oil by vacuum filtration when 7 mls of oil were recovered. The recovered particles were reused repetitively to remove fresh oil slicks prepared as above.

EXAMPLE 11

Example 10 was repeated using the particles prepared in Example 7 in place of the particles prepared in Example 6. Similar results were obtained as in Example 10 except that as the particles were prepared from a soft ferrite it was easier to remove the particles from the magnetic field and also redispersion of recycling the particles was easier as little permanent magnetism was induced in the particles.

EXAMPLE 12

To an oil slick prepared as in Example 10 there were added the particles (5 g.) prepared in Example 8. The particles were drawn together by a magnet to the centre of the dish forming a clump of particles, held together by magnetic forces. The particles and oil were set on fire and burned until nearly all the oil was removed from the surface, leaving a non-polymeric iron oxide sludge which settled to the bottom of the dish.

EXAMPLE 13

This illustrates the use of a polymer particle for the removal of very fine droplets of water dispersed in an oil. The particles were prepared as follows.

A mixture of a 25% aqueous solution (4.55 ml) of glutaraldehyde and 2 g. of gamma-iron oxide was added to 50 ml of a 20% w/v aqueous solution of 'Gelvatol 20–30', and after being thoroughly mixed the whole was acidified by addition of hydrochloric acid (2 N; 2.87 ml). The mixture was stirred by hand for 15 sec. before being dispersed into droplets by addition to stirred mineral oil (200 ml; 'Ondina 33' Trade Mark of Shell Oil Co. Ltd.) at ambient temperature. After continuous mechanical stirring for 45 minutes, the temperature of the suspension was raised during 15 minutes to 70° C and maintained at that level for a further 20 minutes. The cross-linked polyvinyl alcohol particles thus formed were separated from the cooled mixture, washed with hexane to remove adherent oil, then with acetone and finally with water, in a column, until the effluent was free from chloride ion and had a pH of 5 or greater. The washed product was partially dehydrated by treatment with acetone and finally dried in vacuo at 50°–60° C. for 24 hrs., to yield hard particles of cross-linked polyvinyl alcohol in the size range 0.5 – 5 microns. The size of the particles within this range was controlled by varying the stirring speed during their preparation.

When a suspension of fine droplets of water in kerosene was added to the dried beads at room temperature they rapidly absorbed the water. When the beads had absorbed about 50% by weight of water they were fully swollen. On heating them to 80° C they shrunk and 35% by volume of water oozed out of the beads and was removed. After the beads were cooled they could reabsorb water.

When water continued to be added to the fully swollen cold particles they joined together as a film of water developed around the particles and encased them. The swollen particles and associated water were removed from the kerosene by means of a magnet covered with polythene film. The particles and associated water were removed from the magnet by pulling off the polythene film.

In a comparative experiment particles were prepared by a similar method but without using any ferromagnetic material. It was found that although these particles absorbed the water satisfactorily they could not be separated from the kerosene easily unless the minimum size of the particles was about 100 microns.

EXAMPLE 14

This Example demonstrates the use of the invention in removing a fine suspension of clay from water.

3 g. of the beads prepared in Example 9 were suspended in water and poured into a 1 inch glass funnel (porosity 2) on which was placed a close fitting "Whatman No. 54" (Trade Mark) filter paper to form a filter bed. The beads were unmagnetised.

A bed was formed approximately ¼ inch deep. Water filtered through this bed at a rate of 10 ml per minute under a constant head of 7 inches.

A suspension of kaolin in water was prepared by decantation from a coarse suspension. This suspension had a turbidity of 40 Jackson turbidity units (JTU) which was unchanged when passed through a "Whatman No. 54" filter paper. This suspension was filtered through the bed of the filter aid. The filtrate was clear.

TABLE I

| Amount of Suspension filtered | Turbidity reading of Filtrate JTU |
|---|---|
| After 50 ml | 2.3 |
| " 100 " | 2.4 |
| " 150 " | 2.7 |
| " 200 " | 1.5 |

The filtration rate at a steady head of 7 inches fell steadily from 5 ml/min. to 0.5 ml/min. after the passage of 300 ml. The results are given in Table I.

After completion of the filtration cycle a small slug of filtrate was passed in the reverse direction through the filter septum so as to dislodge the filter cake which was slurried with the filtrate. The filter aid was then removed with a magnet, rinsed free of entrapped residue by reslurrying and magnetic recovery, then demagnetised and reused. The reused filter aid performed as in the previous cycle.

A comparison was made with 'Hyflo Supercel' (Trade Mark for a diatomaceous earth).

3 g. of 'Hyflo Supercel' was suspended in water and formed a filter bed ¼ inch deep on a "Whatman No. 54" filter paper. A portion of the kaolin suspension prepared above was filtered through the filter bed.

TABLE II

| Suspension passed | Turbidity Readings |
|---|---|
| After 50 ml | 5.0 JTU |
| " 100 " | 4.5 JTU |
| " 200 " | 1.5 JTU |

The filtration rate at a head of 7 inches fell steadily from 9 ml/min. to 2 ml/min. after passage of 300 ml. The results are given in Table II.

However, the filter aid could not be cleaned by elutriation because the settling rate of the 'Hyflo Supercel' was too low.

EXAMPLE 15

This Example compares the effect of using the particles prepared in Examples 6 and 9, in a magnetised and unmagnetised state as filter aids; with the effect of using 'Hyflo Supercel' and 'Celite 545' (Trade Mark for a diatomaceous earth).

The particles prepared in Examples 6 and 9 were magnetised by passing them briefly through the poles of a large shoe magnet.

Turbid water was prepared by decanting the fine material from a suspension of kaolin and diluting this with tap water to a standard turbidity of 40 Jackson Turbidity Units (JTU). The filter bed was in each case prepared by the following method. A disc of "Whatman No. 54" filter paper was inserted into a 3 cm. diameter sinter glass tube filter, porosity 2. The filter aid was dispersed in water, and the dispersion poured onto the filter paper.

Six beds, A, B, C, D, E and F, were prepared of the following materials respectively:

| Bed A | 2 g 'Hyflo Supercel' |
|---|---|
| Bed B | 2 g 'Celite 545' |
| Bed C | 3 g unmagnetised material prepared in Example 6 |
| Bed D | 3 g magnetised material prepared in Example 6 |
| Bed E | 3 g unmagnetised material prepared in Example 9 |
| Bed F | 3 g magnetised material prepared in Example 9 |

The magnetised materials formed a deeper bed than the unmagnetised materials.

Samples of the turbid water were filtered through each of the six beds, A, B, C, D, E and F, prepared by the above method, and an average head of 15 cm. was maintained. The filter beds C, D, E and F were back washed using clean water. After agitation the filter aids were allowed to settle and the turbid wash water decanted off. After three back washing operations the filter beds were reused and had unimpaired efficiency. It was noted that the magnetised materials had the higher settling rates. The beds, A and B, formed from 'Celite' and 'Hyflo Supercel' could not be backwashed in this manner. The rates of filtration and the efficiency of filtration for each of the six beds are given in Table III.

The results demonstrate that the ferromagnetic particles of our invention are superior to 'Celite 545' whether they be magnetised or unmagnetised and in comparison to 'Hyflo Supercel' they have enhanced filtration rates and the unmagnetised particles are similar in their efficiency of removal of turbidity. The ferromagnetic particles of our invention have the added advantage that they may be recovered and reused in phase separation processes whereas the diatomaceous earths cannot be so recovered.

TABLE III

| Volume ml | Bed A | | Bed B | |
|---|---|---|---|---|
| | Time min. | Turbidity JTU | Time min. | Turbidity JTU |
| 50 | 6 | 6.5 | 1.2 | 12 |
| 100 | 16 | 1.7 | 3.0 | 14 |
| 150 | 24 | 0.9 | 4.5 | 12 |
| 200 | 33 | 0.5 | 6.2 | 11 |
| 250 | 49 | 0.5 | 8.0 | 12 |
| 300 | 65 | 0.3 | 10.0 | 12 |
| 350 | 85 | 0.3 | 12.2 | 12 |
| | BED C | | BED D | |
| 50 | 5 | 8 | 1.5 | 7.5 |
| 100 | 12 | 1.5 | 3.7 | 6.5 |
| 150 | 22 | 0.5 | 6.0 | 8.0 |
| 200 | 35 | 0.5 | 8.0 | 8.0 |
| 250 | 55 | 0.3 | 10.0 | 9.0 |
| 300 | 76 | 0.2 | 12.2 | 8.0 |
| 400 | — | — | 17.0 | 8.5 |
| 500 | — | — | 22.7 | 9.0 |
| 600 | — | — | 29.0 | 9.5 |
| | BED E | | BED F | |
| 50 | 4.0 | 6.0 | 4.7 | 3.5 |
| 100 | 9.5 | 1.0 | 10.0 | 2.5 |
| 150 | 16.0 | 0.5 | 16.0 | 2.2 |
| 200 | 24.0 | 0.4 | 24.0 | 2.0 |
| 250 | 37.0 | 0.2 | 34.0 | 1.5 |
| 300 | 52.0 | 0.2 | 42.0 | 2.0 |
| 400 | 77.0 | 0.2 | 63 | 1.2 |
| 500 | — | — | 90 | 0.7 |
| 600 | — | — | 122 | 0.5 |

EXAMPLE 16

This Example demonstrates the use of our invention in separating viscous suspensions formed in chemical processes. A slurry was obtained from a polymerisation reaction. This slurry contained a 5% w/w suspension of 4–6 micron cross-linked polyacrylic acid beads in an aqueous reaction medium comprising linear polymer and other by-products and was highly viscous. When filtration was attempted, with various grades of previously known filter aids, no more than a few drops could be filtered before the filter became blocked each time by a layer of gel on the surface of the septum. A precoat layer of the particles prepared in Example 6, was formed on a monofilament polypropylene filter cloth (2/2 Twill, 68 × 30, 8.5 oz. / sq. yd.) as a bed 0.2 cm. deep, on a filter 23 cm$^2$ in area. 5.0 g of the particles prepared in Example 6 were suspended in 25 ml of the resin suspension as body feed. Filtration of the suspension through the precoated septum then proceeded at the rate of 1 ml/min. until the filter cake was dry. The upper layer of filter cake was resuspended in water and the particles removed from the resin by magnetic means. By such means it was possible to separate the polyacrylic acid beads from the dissolved by-products present in the slurry after completion of the polymerisation reaction.

EXAMPLE 17

This example describes the preparation of magnetic particles of irregular shape and size and comprising an urea formaldehyde resin.

326 g of 'black iron oxide' 318M were dispersed by suitable means in 326 g of urea formaldehyde syrup ("Mouldrite" A256, Registered Trade Mark of Imperial Chemical Industries of Australia and New Zealand Limited) to which was added 15 g 'Teric' PE68 (Trade Mark of Imperial Chemical Industries of Australia and New Zealand Limited for an alkylene oxide condensate) until the oxide was unagglomerated.

This dispersion was added to 1300 ml ortho-dichlorobenzene with 13 g of 'Span' 85 (Trade Mark Imperial Atlas for a polyoxyethylene sorbitan monooleate) with stirring. Stirring was continued at a constant rate for 15 – 30 minutes. 15 ml of 2N. hydrochloric acid were added and the resin was allowed to gel; 300 ml of ortho-dichlorobenzene were added and stirring continued for 1 hour. Curing was completed under gentle agitation for 12 hours at room temperature. The beads were then filtered, ortho-dichlorobenzene was removed by steam distillation and the beads were dried in an oven at 110° C.

The magnetic particles so obtained were designated FA$_1$; the experiment was repeated with a different stirring rate to give a preparation of magnetic particles designated FA$_2$.

EXAMPLE 18

The two samples of magnetic particles FA$_1$ and FA$_2$ prepared according to the method of Example 17 were tested using the method described in Example 14. 1.5 g of magnetic particles were suspended in water and poured into a 1 inch glass funnel with a sintered glass disc (porosity 2) on which was placed a close fitting "Whatman No. 54" filter paper to form a filter bed. The bed formed was approximately ¼ inch deep.

A suspension of kaolin in water was prepared by decantation from a coarse suspension. This suspension had a turbidity of 12.5 Jackson turbidity units (JTU) which was unchanged when passed through a "Whatman No. 54" filter paper. This suspension was filtered through the bed of filter aid under a head of 37.5 cm.

Two filter aids designated FA$_1$ and FA$_2$ were tested in the unmagnetised and magnetised form, (indicated by the prefix D and M respectively) and compared with 'Hyflo Supercel' and 'Celite' 503 as filter aids.

FA$_1$ had an average particle size of 50 – 75 microns and FA$_2$ had an average size of 25 microns. 'Celite' 503 had an average particle size of 15 microns and 'Hyflo Supercel' had an average size of 11 microns.

In FIG. 1 the volume of clay suspension passed through the bed is plotted against time and the average turbidity of the product water indicated against the curves so obtained. It can be seen from these curves that considerably better flow rates were achieved than with the comparative commercial samples and that the blinding of the bed occurred much later.

The magnetised particles form beds with better flow rates than the unmagnetised ones, without substantially reducing the quality of the product water.

EXAMPLE 19

This example demonstrates the reuse of filter aids.

The filter aids $FA_1$ and $FA_2$ used in Example 18 were removed from the test apparatus, placed in a glass tube, suspended in 10 mls of water by vigorous shaking and settled by attraction in a magnetic field. The supernatent liquid was decanted retaining the filter aid with a magnet held near the side of the tube. The clean filter aid was then again tested as in Example 18, after passing through a demagnetisation cycle.

The filter aids performed as before giving the same filtration characteristics as previously shown in FIG. 1 for the unrecycled filter aids.

EXAMPLE 20

This example describes a shell grafted filter aid.

A resin prepared by the general method described in Example 17, with a particle size of 250 micron, was treated as follows.

20 g of resin, 20 ml of 2-vinyl pyridine and 20 ml of methanol were placed in a 100 ml round bottom flask fitted with nitrogen inlet and outlet tubes, the end of the inlet tube dropping into the liquid. The sample was purged with nitrogen for 5 minutes and then irradiated with gamma rays from a Cobalt 60 source at room temperature at a dose rate of 0.3 megarad per hour to a total dose of 6 megarad. The sample after irradiation was washed with methanol till free of homopolymer. The resultant resin was then treated with a solution of 20 ml of cetyl bromide in 80 ml of ethanol under reflux for 24 hours.

The resin was then filtered, washed with ethanol until free of cetyl bromide and dried in vacuo at 60° C overnight.

A resin was obtained which had 1% by weight polyvinyl pyridinium cetyl bromide grafted to the surface.

EXAMPLE 21

The ungrafted resin and the shell grafted resin both prepared as in Example 20 were tested by the method described in Example 18 in the magnetised form. The ungrafted resin had no effect and the turbidity of the product and feed water were both the same (17.5 JTU). The shell grafted resin however gave a product water of 3.0 JTU for a feed of 17.5 JTU. The flow rate in each case was 100 ml/min.

EXAMPLE 22

Filter aid $FA_1$ from Example 18 was used both in the magnetised state ($M-FA_1$) and in the unmagnetised state ($D-FA_1$) to filter a number of different waters and effluents and its efficiency was compared with similar use of 'Celite' 503.

The results are given in Table IV below expressed as the turbidity of the product water after 100 ml had passed through the bed under the test conditions set out in Example 18.

TABLE IV

| Filter Aid | Type of Feed | Feed Turbidity JTU | Product Turbidity JTU | Flow rate after 100 mls in mls/min |
|---|---|---|---|---|
| $M-FA_1$ 'Celite' | Tap water | 4.5 | 0.3 | 50 |

TABLE IV-continued

| Filter Aid | Type of Feed | Feed Turbidity JTU | Product Turbidity JTU | Flow rate after 100 mls in mls/min |
|---|---|---|---|---|
| 503 | " | 4.5 | 0.6 | 10 |
| $D-FA_1$ | Effluent from an autoclave being used for polyvinyl chloride manufacture | 19.6 | 0.1 | 40 |
| 'Celite' 503 | " | 19.6 | 0.7 | 7 |
| $M-FA_1$ | River water | 8.5 | 0.5 | 50 |
| 'Celite' 503 | " | 8.5 | 0.7 | 9 |

EXAMPLE 23

The general procedure of Example 1 was repeated to give a resin having an average particle size of 50–100 microns. 120 g of the product was slurried with 240 ml of water in a jacketed reactor. Oxygen was passed through the stirred slurry while the slurry was irradiated at 5° C for 20.5 hours at a dose rate of 0.344 megarad/hr (total dose 7.1 megarad). During the last five minutes of irradiation the oxygen was replaced with nitrogen. A solution of 5.5 g ferrous ammonium sulphate ($Fe(NH_4)_2(SO_4)_2.6H_2O$) in 30 ml of water was added immediately and the mixture allowed to stand for 5 minutes. 75 g of acrylic acid were added quickly during which addition the temperature rose from 5° C to 8° C. The mixture was cooled to 5° C and stirred for 1 hour, filtered, washed with water and dried in vacuo at 60° C. 145.8 g of grafted resin were obtained which corresponded to 17.7% grafted polyacrylic acid.

The magnetised grafted resin was compared with the magnetised ungrafted resin when used as a filter aid. The results were as shown in Table V.

TABLE V

| Resin | Feed Turbidity JTU | Product Turbidity JTU | Flow rate mls/min |
|---|---|---|---|
| Magnetised ungrafted | 17.5 | 6.7 | 50 mls/min |
| Magnetised grafted | 17.5 | 3.6 | 70 mls/min |

EXAMPLE 24

This example described the preparation of vesiculated magnetic polystyrene particles having different particle sizes and porosities and suitable for the removal of oil slicks from water.

The general procedure of Example 6 was repeated using the following four sets of ingredients shown in Table VI to give four samples of resins A, B, C, and D respectively. The polyester solution was as used in Example 6.

TABLE VI

| Ingredients | Resin A | B | C | D |
|---|---|---|---|---|
| Polyester solution | 72.5 g | 72.5 g | 72.5 g | 72.5 g |
| Styrene | 55.5 g | 55.5 g | 55.5 g | 55.5 g |
| 'Triten' X45 | — | 1.0 g | — | — |
| 'Teric' X5 | — | — | 1.0 g | 1.0 g |
| 'Topanol' A | — | — | 0.13 g | — |
| Water | 228 g | 61 g | 91.0 g | 91.0 g |
| Diethylene- | | | | |

TABLE VI-continued

| Ingredients | Resin A | B | C | D |
|---|---|---|---|---|
| triamine | 0.57 g | 0.57 g | 0.57 g | 0.57 g |
| 'Black Iron Oxide' 318M | 61 g | 61 g | 61 g | 61 g |
| $NH_3$ | 0.5 g | 0.8 g | 0.8 g | 0.8 g |
| Cumene Hydroperoxide | 3.0 g | 3.0 g | 3.0 g | 3.0 g |
| Water | 750 g | 1000 g | 1000 – 1200 g | 1000 – 1200 g |
| Hydroxyethyl cellulose | 1.0 g | 1.0 g | — | 1.0 g |
| Methyl cellulose | — | — | 1.0 g | — |
| 'Gelvatol' 7½% 20/90 | 30.0 g | 30 g | 30 g | 30 g |

The resins obtained had the physical characteristics shown in Table VII.

TABLE VII

| Resin | Average Size | Density g/ml | Porosity % |
|---|---|---|---|
| A | 30–40 mu | 0.45 | 74 |
| B | 100 mu | 1.09 | 38 |
| C | 10–30 mu | 0.78 | 55 |
| D | 800 – 1200 mu | 0.58 | 69 |

EXAMPLE 25

The resins A, B, C and D prepared in Example 24 were tested to determine the effect of porosity and particle size on oil pick-up efficiency. 20 g of Kuwait crude oil was added to four Petri dishes containing water. After 5 minutes exactly 1 g of each of the resins A, B, C and D separately was applied to the oil. A large horse-shoe magnet placed inside a plastic bag was used to attract the resin and associated oil. To make sure all the resin was removed from the oil surface another application of the magnet in a clean plastic bag was used. The weight of the oil picked up was determined. This was expressed as $$\frac{\text{weight of oil picked up}}{\text{weight of powder used}} \times \frac{100}{1}$$

and the following results were obtained

| Resin A | 700 |
|---|---|
| Resin B | 415 |
| Resin C | 422 |
| Resin D | 420 |

Similar experiments were carried out for crude oils of differing origins and using both sea and and river water. The results obtained in these experiments were similar and averaged around 450.

EXAMPLE 26

This example describes the use of magnetic resin particles to reduce water spray.

A 6 inch diameter tube and six feet in length, closed at the bottom and top was provided with a nozzle at the bottom and a 1 inch side arm near the top. The nozzle was connected to a compressed air supply via a regulating valve.

In the tube was placed 1 litre of tap water and the air turned on to 30 psi causing a spray of air and water to rise in the tube. After 30 minutes 250 ml of water was lost through the side arm in the form of spray and mist.

The experiment was repeated but to the water was added 100 g of a resin prepared as in Example 1 with a particle size of 5 microns.

A 4000 gauss horse-shoe magnet was placed with the pole pieces straddling the side arm. After 30 minutes under the same conditions as used before only 75 mls of water was lost.

EXAMPLE 27

The preparation described in Example 17 was repeated to give a resin having a particle size of from 50 to 100 microns. A filter bed was prepared by precoating a coarse polypropylene screen with the resin to a depth of 0.5 inches. The filter bed was treated with 0.02% by weight of 'Primafloc' C5 (Trade Mark for a water soluble cationic polyelectrolyte of the polyamine type). Water obtained from the Yarra River having a turbidity of 10 JTU was filtered through the bed under a gravity head of 1.2 feet. The flow rate was initially 0.6 gal/min/ft$^2$ and had fallen to 0.34 gal/min/ft$^2$ after passage of 200 bed volumes. The filtrate initially had a turbidity of 0.1 JTU and after 200 had a turbidity of 0.48 JTU.

The precoat was backwashed, using a magnet to retain the resin and filtration recommended. The flow rate under the same conditions commenced at 0.7 gal/min/ft$^2$ and gradually fell to 0.27 gal/min/ft$^2$ after 400 bed volumes had been filtered.

The turbidity of the product varied between 0.7 and 1.5 JTU.

The precoat was backwashed again, and on replacement gave substantially the same results.

This cycle was repeated many times.

EXAMPLE 28

A sample of the shell grafted resin prepared in Example 20 was used as a filter aid to filter sewage. A filter bed was prepared by precoating a coarse polypropylene screen with the shell grafted resin to a depth of 0.5 inches. Raw sewage obtained from a sewage plant having a turbidity of 52 JTU was filtered through the bed under a level of 1.2 feet. The initial flow rate was 1.2 gals/min/ft$^2$ and after 20 bed volumes the flow rate had fallen to 0.12 gals/min/ft$^2$ the filtrate obtained had an average turbidity of 0.5 JTU and had only 50% of the initial C.O.D.

The bed was backwashed, replaced and reused to give substantially the same result.

The experiment was repeated using as feedstock the overflow from the primary sedimentation stage at a sewage plant. The feet had a turbidity of 35 JTU. The initial flow rate was 0.42 gals/min/ft$^2$ and after 20 bed volumes this had fallen to 0.1 gals/min/ft$^2$. The average turbidity of the product water was 0.03 JTU. After backwashing and repeated magnetisation and demagnetisation of the resin the precoat was replaced and the experiment repeated. Substantially the same results were obtained. This cycle of operation was repeated many times.

EXAMPLE 29

A liquor derived from biological leaching of copper ore contained 1.0 grams per litre of Cu at a pH of 3.5. It was extracted with 0.3 volumes of a 25% solution of 2-hydroxybenzophenoxime in kerosene, which was embodied in a floc of the synthetic ferromagnetic polymer prepared in Example 24 and designated resin A. The liquor was extracted in a countercurrent system comprising three stages of mixing, separated by three stages of settling, in which the flocs were transferred by magnetic means countercurrently to the flow of leach liquor.

The organic extractant attained a concentration of 3.0 grams per litre Cu, and was stripped by sulphuric acid in a countercurrent system of four stages, to yield a recycle stream of organic extractant, and a solution of copper sulphate, from which the copper was recovered by electrolysis.

EXAMPLE 30

An effluent from a petrochemical plant contained 15 ppm of dissolved copper and was extracted with 0.05 volumes of an organic extractant comprising 2-hydroxybenzophenoximes dissolved in kerosene and embodied in a floc of the synthetic ferromagnetic polymer prepared in Example 24 and designated resin D. A single extracting stage reduced the copper in the effluent to 0.1 ppm. The organic extractant was skimmed from the surface of the effluent by magnetic means, the copper recovered by extraction and the organic extractant recycled.

We claim:

1. A process of filtering suspensions of particulate matter in a liquid medium which comprises utilizing, as a filter aid, a bed comprising magnetized ferromagnetic synthetic polymeric particles wherein the particles are in the size range from 0.5 to 40 microns overall diameter.

2. The process of claim 1 wherein the bed is regenerated for further use by back-washing with water.

3. A process according to claim 1 wherein the ferromagnetic synthetic polymeric particles comprises a polymeric material selected from the group consisting of polystyrene, copolymers of styrene and polyesters, polyesters, methyl methacrylate polymers and copolymers, phenol formaldehyde resins, polyvinyl chloride, polyolefines, polyamides, polyvinyl alcohol, urea formaldehyde resins and melamine formaldehyde resins.

4. A process according to claim 1 wherein the liquid medium is polar and the synthetic ferromagnetic polymer comprises a ferromagnetic particle incorporated either wholly or partially in a polymeric material selected from the group consisting of polyvinyl alcohol, urea formaldehyde resins and melamine formaldehyde resins.

5. A process according to claim 1 wherein the synthetic ferromagnetic particles are vesicular or retiporous.

6. A process according to claim 1 wherein the ferromagnetic synthetic polymer is of the shell graft type.

7. A process according to claim 6 wherein the shell graft comprises an inert core of polymer selected from the group consisting of polyvinyl alcohol, urea formaldehyde resin and melamine formaldehyde resin grafted with a shell of a polymer selected from the group consisting of polyacrylic acid, polyacrylamide, polymethylacrylate and polymers of quaternised amino monomers.

8. A process according to claim 1 wherein the liquid medium is sewage effluent.

9. A process according to claim 1 wherein the liquid medium is industrial effluent.

10. A process according to claim 1 wherein the liquid medium is potable water.

11. A process according to claim 10 wherein the water is feedstock for a subsequent Sirotherm desalination process.

* * * * *